(12) United States Patent
Anderson

(10) Patent No.: US 7,373,161 B2
(45) Date of Patent: May 13, 2008

(54) METHOD AND ARRANGEMENT FOR POWER CONTROL

(75) Inventor: Nicholas William Anderson, Bath (GB)

(73) Assignee: IPWireless, Inc., San Bruno, CA (US)

(*) Notice: Subject to any disclaimer, the term of this patent is extended or adjusted under 35 U.S.C. 154(b) by 576 days.

(21) Appl. No.: 10/309,498

(22) Filed: Dec. 4, 2002

(65) Prior Publication Data

US 2004/0043783 A1 Mar. 4, 2004

(30) Foreign Application Priority Data

Dec. 5, 2001 (GB) ................ 0129098.0

(51) Int. Cl.
*H04B 7/00* (2006.01)
*H04Q 7/20* (2006.01)

(52) U.S. Cl. ............ 455/522; 455/67.11; 455/69; 455/13.4; 455/12.1; 370/318; 370/320; 370/335

(58) Field of Classification Search ............ 455/67.11, 455/69, 13.4, 522, 127.1; 370/318, 320, 370/335
See application file for complete search history.

(56) References Cited

U.S. PATENT DOCUMENTS

| 5,982,813 | A | * | 11/1999 | Dutta et al. ............ 375/219 |
| 6,167,273 | A | * | 12/2000 | Mandyam ............ 455/450 |
| 6,262,994 | B1 | | 7/2001 | Dirschedl et al. |
| 6,549,785 | B1 | * | 4/2003 | Agin ............ 455/522 |
| 6,574,211 | B2 | | 6/2003 | Padovani et al. |
| 6,711,150 | B1 | * | 3/2004 | Vanghi ............ 370/342 |
| 6,760,303 | B1 | * | 7/2004 | Brouwer ............ 370/229 |
| 6,868,075 | B1 | * | 3/2005 | Narvinger et al. ............ 370/335 |
| 2001/0021229 | A1 | * | 9/2001 | Belaiche ............ 375/295 |
| 2002/0173330 | A1 | * | 11/2002 | Kojima et al. ............ 455/522 |
| 2004/0152483 | A1 | * | 8/2004 | Furukawa ............ 455/522 |
| 2005/0013287 | A1 | * | 1/2005 | Wallentin et al. ............ 370/352 |

FOREIGN PATENT DOCUMENTS

| CN | 1175873 A | 3/1998 |
| CN | 1237834 A | 12/1999 |
| CN | 1284821 A | 2/2001 |
| EP | 0 790 713 A2 | 8/1997 |
| EP | 0 790 713 A3 | 8/1997 |

(Continued)

OTHER PUBLICATIONS

GB Examination Report mailed on Apr. 25, 2005 for Application No. GB129098.0, three pages.

(Continued)

*Primary Examiner*—Sujatha Sharma
(74) *Attorney, Agent, or Firm*—Morrison & Foerster LLP

(57) ABSTRACT

A method for setting a power control level (600) in a wireless communication system. The method includes the steps of obtaining (620) transmission information from a wireless subscriber unit, and modifying a power control level and/or a communication channel format (660) in response to said transmission information. Preferably, the transmission information is re-transmission requests from a wireless subscriber unit, which are transmitted frequently. In this manner, rapid adjustment of power control can be attained utilising an optimal selection of the available communication channel format, followed by a fine-tuning power control operation.

4 Claims, 6 Drawing Sheets

FOREIGN PATENT DOCUMENTS

| | | | |
|---|---|---|---|
| EP | 1077534 | A1 * | 8/1999 |
| EP | 1089458 | A2 * | 12/1999 |
| EP | 1033849 | | 9/2000 |
| EP | 1069704 | | 1/2001 |
| EP | EP-1158715 | | 11/2001 |
| EP | 1 233 564 | A1 | 8/2002 |
| EP | 1 233 564 | B1 | 8/2002 |
| JP | 2001292097 | * | 10/2001 |
| WO | WO-0124566 | | 4/2001 |
| WO | WO-0141332 | | 6/2001 |
| WO | WO-0189097 | | 11/2001 |

OTHER PUBLICATIONS

International Search Report mailed Feb. 26, 2003, for PCT/GB02/05541, filed Dec. 5, 2002, two pages.

Search Report dated Jun. 14, 2002 for GB Application No. 0129095.0, three pages.

Qualcomm (Oct. 2008). "Commonalities between CDMA2000 and WCDMA Technologies," Qualcomm Incorporated, pp. 1-46.

"3rd Generation Partnership Project; Technical Specification Group Radio Access Network; Radio Interface Protocol Architecture (Release 5)," (Sep. 2002). 3GPP:Valbonne, France, TS 25.301 v5.2.0:1-43.

"3rd Generation Partnership Project; Technical Specification Group Radio Access Network; Physical Layer Procedures (TDD) (Release 5)," (Sep. 2002). 3GPP:Valbonne, France, TS 25.224 v5.2.0:1-45.

Chinese Office Action mailed Nov. 17, 2006, for China Application No. 02816857.1 filed Dec. 5, 2002, 14 pages.

Bender, P. et al. (Jul. 2000). "CDMA/HDR: A Bandwidth-Efficient High-Speed Wireless Data Service for Nomadic Users," *IEEE Communications Magazine*, pp. 70-77.

\* cited by examiner

METHOD AND ARRANGEMENT FOR POWER CONTROL

FIELD OF THE INVENTION

This invention relates to power control in a wireless communication system. The invention is applicable to, but not limited to, closed-loop power control in a UMTS terrestrial radio access (UTRA) time division duplex (TDD), code division multiple access (CDMA) communication system.

BACKGROUND OF THE INVENTION

Wireless communication systems, for example cellular telephony or private mobile radio communication systems, typically provide for radio telecommunication links to be arranged between a plurality of base transceiver stations (BTS), referred to as Node Bs with regard to universal mobile telecommunication system (UMTS) systems, and a plurality of subscriber units, often referred to as user equipment (UE) in UMTS systems.

The communication link from a Node B to a UE is generally referred to as a down-link communication channel. Conversely, the communication link from a UE to a Node B is generally referred to as an up-link communication channel.

In an UTRA-based wireless communication system, each Node B has associated with it a particular geographical coverage area (or cell). The coverage area is defined by a particular range over which the Node B can maintain acceptable communications with UEs operating within its serving cell. Often these cells combine to produce an extensive coverage area.

In such wireless communication systems, methods exist for communicating information simultaneously where communication resources in a communication network are shared by a number of users. Such methods are termed multiple access techniques. A number of multiple access techniques exist, whereby a finite communication resource is divided into any number of physical parameters, such as:

(i) Frequency division multiple access (FDMA) whereby frequencies used in the communication system are shared, (ii) Time division multiple access (TDMA) whereby each frequency used in the communication system, is shared amongst users by dividing the communication resource (each frequency) into a number of distinct time periods (time-slots, frames, etc.), and (iii) Code division multiple access (CDMA) whereby communication is performed by using all of the respective frequencies, in all of the time periods, and the resource is shared by allocating each communication a particular code, to differentiate desired signals from undesired signals.

Within such multiple access techniques, different duplex (substantially simultaneous two-way communication) paths are arranged. Such paths can be arranged in a frequency division duplex (FDD) configuration, whereby a first frequency is dedicated for up-link communication and a second frequency is dedicated for down-link communication.

Alternatively, the paths can be arranged in a time division duplex (TDD) configuration, whereby a first time period is dedicated for up-link communication and a second time period is dedicated for down-link communication within the same frequency channel. In addition, some communication channels are used for carrying traffic and other channels are used for transferring control information, such as call paging, between the base station and the subscriber units.

Wireless communication systems are distinguished over fixed communication systems, such as the public switched telephone network (PSTN), principally in that mobile stations/subscriber equipment move between coverage areas served by different Node B (and/or different service providers). In doing so, the mobile stations/subscriber equipment encounter varying radio propagation environments. In particular, in a mobile context, a received signal level can vary rapidly due to multipath and fading effects.

The present invention will be described with respect to the $3^{rd}$ Generation Partnership Project (3GPP) technical specification 'TS25.224' for a wireless communication system based on the universal mobile telecommunications standard (UMTS). UMTS is a CDMA-based system. A CDMA system employs spread spectrum signaling. Two categories of spread spectrum communications are direct sequence spread spectrum (DSSS) and frequency hopping spread spectrum (FHSS).

In the case of a DSSS communication system, for example, the spectrum of a signal can be most easily spread by multiplying it with a wide-band pseudo-random code generated signal. It is essential that the spreading signal be precisely known so that the receiver can de-spread the signal. A cellular communication system using DSSS is commonly known as a Direct Sequence Code Division Multiple Access (DS-CDMA) system, one example of which is defined in the TIA-EAI standard IS-95.

Individual users in the system use the same radio frequencies and time slots, but they are distinguishable from each other by the use of individual spreading codes. Hence, multiple communications channels are allocated using a number of spreading codes within a portion of the radio spectrum. Each unique code is assigned to a UE, except for common channels.

One feature associated with most wireless communication systems, which is particularly needed in a UTRA system, allows the transceivers in the Node B and UE to adjust their transmitter output power to take into account the geographical distance between them. The closer the UE is to the Node B's transceiver, the less power the UE and the Node B's transceivers are required to transmit, for the transmitted signal to be adequately received by the other communication unit. This 'power control' feature saves battery power in the UE and also helps to reduce the level of potential interference within the communication system. Initial power settings for the UE, along with other control information, are set by the information provided on a beacon physical channel for a particular cell.

The 3GPP specification assumes a downlink shared channel (DSCH) call model that allows for the implementation of slow measurement-report-based power control of Physical Downlink (DL) Shared Channels (PDSCH's). In such a scheme, the user equipment (UE) is requested to send sporadically measurement reports from which the current mean pathloss between node-B and UE may be determined. In addition, the UE may send interference power measurements. This DL power control scheme is termed "slow" due to the delay in the UE making the measurement and conveying this to the RNC entity via the node-B and due to the measurement reports being sent every few seconds. Measurement reports are sent in gaps between radio link control (RLC) messages that are typically used by a UE to request re-transmission of information (data packets) received in error. This is in contrast with fast (frame or sub-frame) based power control typically applied to dedicated downlink physical channels (DPCHs).

It is known that accurate power control is a vital element of CDMA systems as the spreading codes are not orthogonal on the reverse link. Hence, any error in the power control (PC) levels introduces interference that directly reduces system capacity.

Furthermore, it is known that the 3GPP standard is particularly sensitive to power control mismatches in the up-link because of fast fading effects in the communication channel. Fast fading is a known and generally undesirable phenomenon caused by the signal arriving at a receiver via a number of different paths. Therefore, in order to achieve maximum up-link capacity in a CDMA system, fast power control loops are required.

An inner power control (PC) loop is provided to adjust a UE's transmission power to counter the so-called "near-far" problem. The inner power control loop adjusts the transmission power of each connection such that the received signal power observed at the Node B is sufficient to meet a particular quality of service (QoS) requirement of each particular connection; thereby reducing interference to others in the system. The inner PC loop adjusts the UE's transmission power in order to keep the received reverse link signal-to-interference ratio (SIR) as close to constant as possible.

The predetermined threshold, to which the inner loop SIR measure is compared, is generated by the outer, quality-driven, power control loop. This loop sets a target SIR threshold that is proportional to the required quality of service (QoS) for a given connection (usually defined in terms of target bit error rate (BER) or frame erasure rate (FER)). This target will vary as propagation conditions change, for example as a function of a UE's speed and its specific propagation environment, as both have a major impact on the SIR required at the Node B to maintain the desired QoS.

A reduction in interference is therefore desirable and, from a system-wide perspective, power control can therefore be used in order to maximise the system capacity. If the allocation of power amongst users is carefully managed so as to provide only 'just enough' signal quality at the receiving end then inter-cell interference power will be minimised since too much quality effectively equates to too much power and hence reduced capacity.

Power control can also be employed from a pure link-level-performance perspective in order to mitigate the detection impairments caused through temporal variations in received signal power as a result of the mobile radio propagation channel. If these variations can be removed via effective power control then the required mean SIR at the receiver, necessary to attain a certain bit or block error rate, can be shown to be less than would be required in a fading channel without power control. Thus, if every user can then operate at a lower SIR, system interference is reduced and system capacity is again increased.

Effective power control therefore constitutes an important aspect of overall system design for high-capacity spectrally efficient CDMA deployments.

The power required of a transmitter in order to attain a certain radio link quality (in terms of bit error- or block error rate) is a function of four primary variables:

(i) The pathloss between transmitter and receiver;

(ii) The degree and performance of the error correction (channel coding) scheme employed;

(iii) The prevailing channel propagation conditions (e.g. speed, multipath); and (iv) The data rate transmitted.

Power control is normally employed to track changes in (i)-pathloss and (iii)-channel propagation conditions, since these processes are not under the control of the system operator. However, the degree of error protection and the data rate transmitted are under control of the system operator and this will affect the required amount of transmitted power.

The preferred embodiment of the present invention is described with regard to implementation on the UMTS Radio Access Network (UTRAN) protocol architecture 100, an overview of the pertinent portions of which is described with regard to FIG. 1. The focus of the preferred embodiment of the invention relates to communication between the medium access layer (MAC) (Layer-2) 110 and the physical layer (PHY) (Layer-1) over transport channels, which are the channels over which data is communicated between the MAC 110 and the PHY. The UMTS Radio Access Network (UTRAN) protocol architecture at layer-2 utilises the concept of Transport Channels 140, 142, 144 to control the bit rate and the forward error correction (FEC) scheme that is employed.

Transport Channels 140, 142, 144 may contain one or more Transport Formats 150, 152, 154, 156, 158, 160 that are characterised by two parameter sets:

(i) A semi-static part that is associated with the Transport Channel to which it belongs. This parameter set defines the type of channel coding to be used, the Transmission Time Interval (TTI), the Static Rate Matching Attribute, and the cyclic redundancy code (CRC) length.

(ii) A dynamic part that is specific to the Transport Format. This parameter set defines the Transport Block size and the Transport Block Set Size, which is equal to the Transport Block Size multiplied by the number of Transport Blocks to be transmitted within the TTI.

Thus, all Transport Formats 150, 152, 154, 156, 158, 160 within the same Transport Channel 140, 142, 144 inherit the same semi-static part, though each of those formats 150, 152, 154, 156, 158, 160 may have a different dynamic part. Transport Formats are identified by labels termed Transport Format Indicators (TFIs).

Coded Composite Transport Channels (CCTrCHs) may be formed by multiplexing one or more Transport Channel processing chains within a multiplexer 170 within Layer-1. The multiplexed output is mapped to an amount of physical resource 180, and in this manner, multiple Transport Channels may be multiplexed onto the same physical resource. This combination of Transport Formats (TFIs) is termed a Transport Format Combination (TFC).

The set of valid TFCs (as configured by layer-3) is termed a Transport Format Combination Set (TFCS) and is notified to the MAC 120. Furthermore, the set of allowed TFCs within the TFCS might be restricted based on factors such as:

(i) The Puncturing Limit (PL), as set by Layer-3;

(ii) The amount of physical resource allocated 125; and (iii) The amount of transmission power required for the TFC.

Higher layers, or lower layers, than the MAC layer 110, may impose these restrictions 130. Either way, the MAC 110 is informed of the TFCS restrictions 130. The MAC 110 in both the radio network controller (RNC) and the user equipment (UE) is then wholly responsible for selection of a TFC from within the resulting allowed set. The selection of a TFC from within this allowed set is generally based on optimisation of the data volume to be transmitted within the constraints of the physical resource allocated. Selection or changing of the current TFCS is managed by higher layers (L3).

Typically, all TFCs within a TFCS require nominally the same signal quality to attain a given bit or block error rate. Layer-3 makes decisions on the TFCS to use, based on information gathered from measurement reports or other metrics. Adjustment of the transmission rate, per physical resource unit, is therefore primarily governed by Layer-3 decisions via appropriate selection of TFCS. This is shown by TFC selection control function 135 within the MAC layer, with TFC selection control input 138 to the Transport channel formatting within Layer-1.

As the amount of error protection in transmissions is reduced, so the available information rate is increased, since fewer parity (or redundancy) bits must be transmitted. However, as the error protection scheme is weakened, so the received energy per bit ($E_b$), relative to the receiver noise spectral density ($N_0$) required to achieve a certain error rate, will increase. Hence, the required transmit power will also increase, which is known as a reduction in the coding gain.

The received signal power (S) is:

$$S = E_b * R \quad [1]$$

where R is the information rate in bits/sec.

The noise power (N) is:

$$N = N_0 * W \quad [2]$$

where W is the receiver bandwidth in Hz.

Hence, the received signal to noise power ratio is simply:

$$\frac{S}{N} = \frac{E_b}{N_0} \times \frac{R}{W} \quad [3]$$

It can be seen from equation [3] that the required received signal to noise ratio to achieve a certain $E_b/N_0$ increases linearly with the bit rate R (given a fixed system bandwidth W). However, the $E_b/N_0$ required to achieve a certain block error rate is a function of the type and amount of coding used and of the prevailing propagation channel conditions.

Thus, as less error protection is applied to a signal, the required transmit power increases for two reasons:

(i) The coding gain is less (higher $E_b/N_0$ is required for a given error rate); and (ii) The information rate (R) is increased, from say, 100 kbits/sec to 200 kbits/sec.

Appropriate selection of the transmission rate (TFCS) is therefore tightly coupled with the power control scheme, since both direct power control and selection of TFCS will affect the transmitted power, and thereby the system capacity. Since power is the shared resource in CDMA systems, TFCS must be tightly managed, in conjunction with power control, in order to maximise system capacity.

When the node-B transmits at full power, many UEs in favourable cell locations will see large values of carrier signal to noise plus interference (C/(N+I)), resulting in excessive (too good) quality for those UEs. Excess quality is undesirable from a network capacity perspective since it implies that unnecessary interference is being injected into the system, or conversely that a sub-optimal data rate is obtained for the transmit power being used.

Two mechanisms can be used to reduce this excess quality:

(i) Reduce the power transmitted to UEs operating with excess C/I (i.e. use downlink power control). In this case, the data rate per code to the UE will stay the same. The quality target of the link is still maintained although the amount of interference to other cells is reduced.

(ii) Decrease the processing gain available to those UEs by increasing the bit rate per code. This is achieved by reducing the amount of forward error correction (FEC) protection applied to the data, before transmission. A number of TFCSs may be employed for this purpose, each having varying degrees of FEC protection. In this case, the data rate to the UE is increased, the quality target is still attained, but the amount of interference generated is not reduced since the power of the transmission has not been reduced.

This link between power control and transport format selection is illustrated in FIG. 2, where a selection of transport format is made, from a number of variable transport formats 230, 240, 250 based on the available carrier to interference (C/I) 210. The C/I required for the low rate 230, medium rate 240 and high rate 250 leaves corresponding various attenuation levels 235, 245 that can be imparted onto the transport formats using power control. As shown, as an example, for a high rate transport format 250, there is no room for attenuation by power control 220 to achieve a reduction in C/I 210.

Hence, in order to provide a transport format that would serve a to-be-transmitted packet data transmission 215 as shown, the medium rate transport format 240 would be selected as this delivers the highest data rate for the C/I available 245. The highest rate transport format 250 is unavailable whereas the lowest rate transport format provides sub-optimal data rate 230 for the available C/I 235. The inventor of the present invention has recognised that slow measurement report-based power control is less than adequate for shared channels.

In general, for shared packet data-based systems it is therefore preferable to maintain full, or close to full transmit power from the node-B whilst maximising the data rate to each user since for data-volume driven applications such as web-browsing and file-transfer, every user benefits from every other user receiving the best data rate possible, at any particular moment in time. This is because physical channel resource is liberated and may be used by other users.

In summary, the 3GPP specifications assume a downlink shared channel (DSCH) call model that allows for the implementation of slow measurement-report-based power control of Physical Downlink (DL) Shared Channels (PDSCHs). In such a scheme, the user equipment (UE) is requested to send measurement reports from which the current mean pathloss between node-B and UE may be determined. In addition, the UE may send interference power measurements. This DL power control scheme is termed "slow" due to the delay in the UE making the measurement and conveying this to the RNC entity via the node-B.

As the PC scheme is relatively slow, it provides a less than optimal solution in PDSCHs. This results in increased interference and sub-optimal use of the available communication resource.

A need therefore exists, in general, for an improved power control arrangement and method of operation, and in particular, an arrangement and method for improved downlink power control for shared channels in an UTRA-TDD system, wherein the above-mentioned disadvantages may be alleviated.

STATEMENT OF INVENTION

In accordance with a first aspect of the present invention, there is provided a method for setting a power control level in a wireless communication system, the method comprising the steps of:

obtaining transmission information from a wireless subscriber unit;

modifying a power control level in response to said transmission information; and modifying a communication channel format in response to said transmission information.

In accordance with a second aspect of the present invention, there is provided a method for selecting a transport format to transmit messages in a wireless communication system, the method comprising the steps of:

obtaining transmission information from a wireless subscriber unit; and modifying a communication channel format in response to said transmission information.

In accordance with a third aspect of the present invention, there is provided a method for setting a power control level, the method comprising the step of:

extracting a portion of a power control signal;

using said portion of a power control signal to determine a signal quality granularity adjustment to transmit a signal in accordance with a number of communication channel formats; and selecting a downlink transmission rate or power control level in response to said determined signal quality granularity.

In accordance with a fourth aspect of the present invention, there is provided a wireless communication unit adapted to incorporate the method steps of the first or second aspect above.

In accordance with a fifth aspect of the present invention, there is provided a wireless communication system adapted to incorporate the method steps of the first, second or third aspect above.

In accordance with a sixth aspect of the present invention, there is provided a radio network controller comprising:

means for obtaining measurement report data from a wireless subscriber unit;

means for determining a downlink transmission rate or power control level based on said measurement report data; and means for modifying a downlink transmission rate or power control level in response to said measurement report data by modifying a communication channel format.

In accordance with a seventh aspect of the present invention, there is provided a storage medium storing processor-implementable instructions for controlling a processor to carry out the method of the first, second or third aspect above.

In summary, a method and apparatus for setting a power control level, a downlink transmission rate, or a transport channel format in a wireless communication system is described. The method and apparatus use transmission information, preferably re-transmission request information, obtained from a wireless subscriber unit; determine a downlink transmission rate or power control level based on the transmission information; and modify a downlink power control level and selecting a communication channel format in response to the transmission information.

Figure 1:
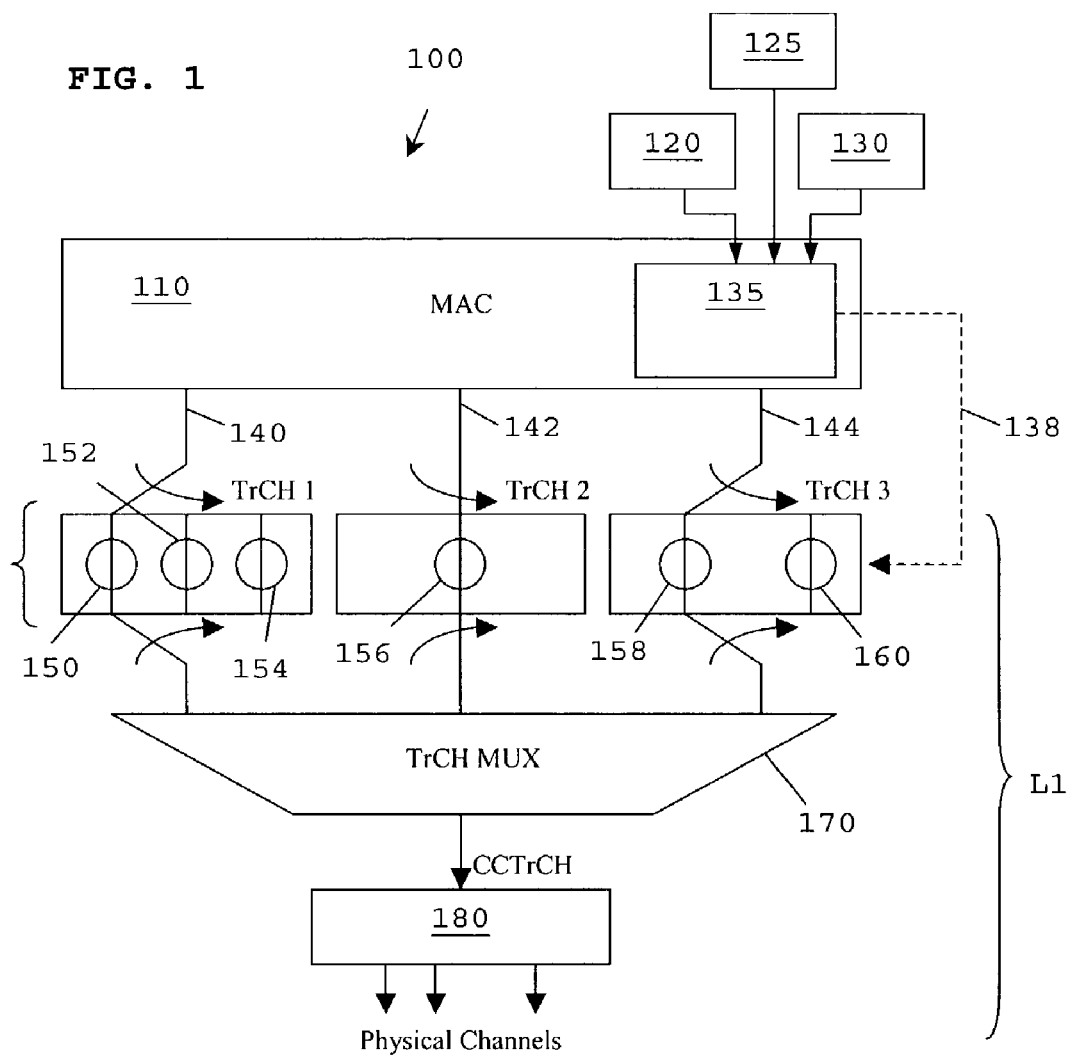
FIG. 1 illustrates a known transport channel architecture for a UTRA TDD-CDMA communication system.
Figure 2:
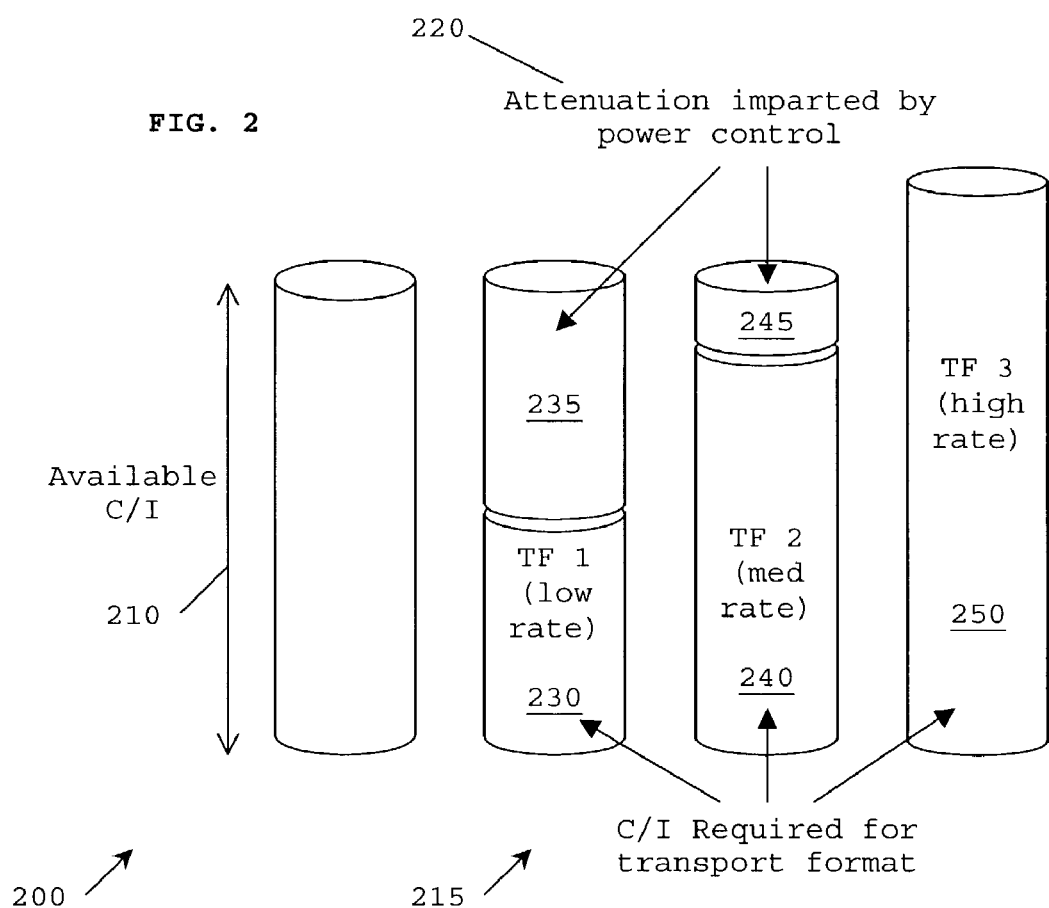
FIG. 2 illustrates a known association between rate control and transport format for a UTRA TDD-CDMA communication system.
Figure 3:
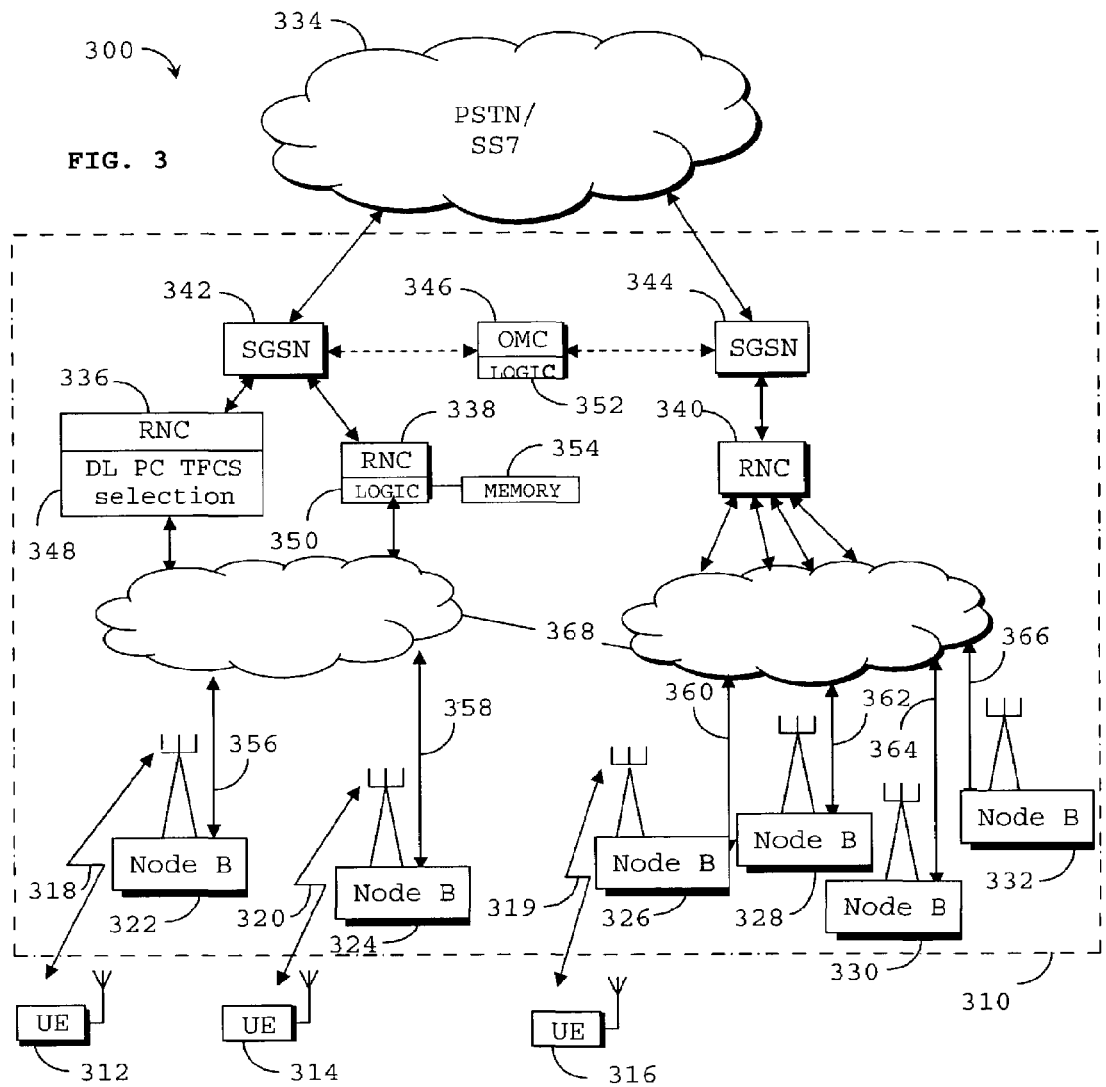
Figure 4:
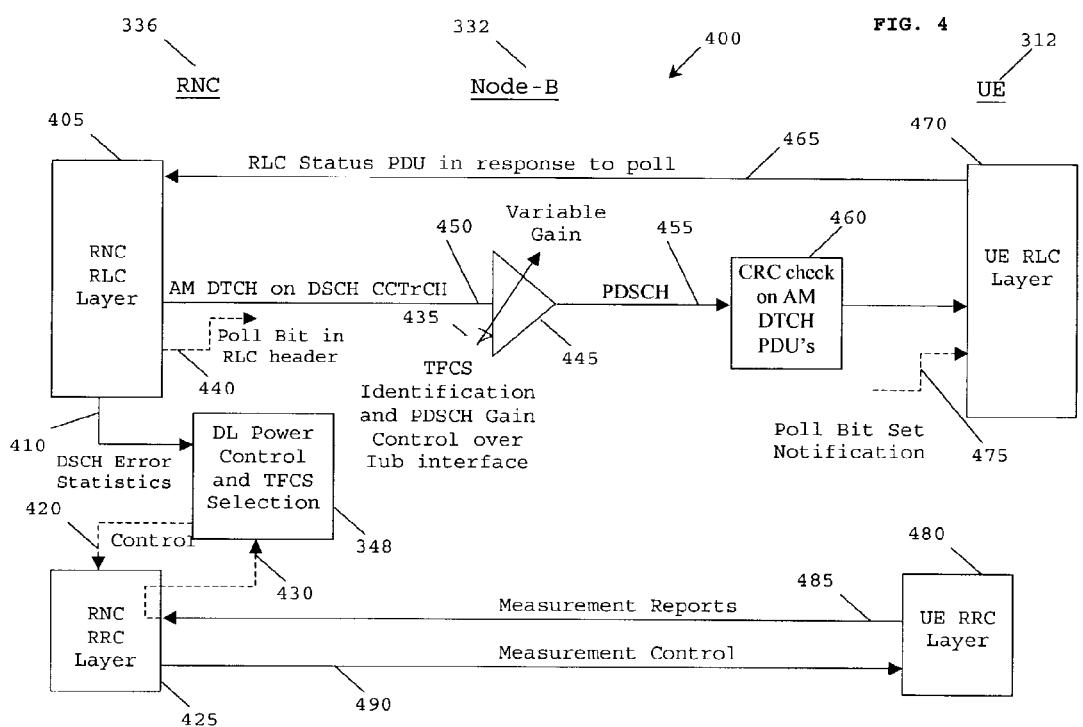
Figure 5:
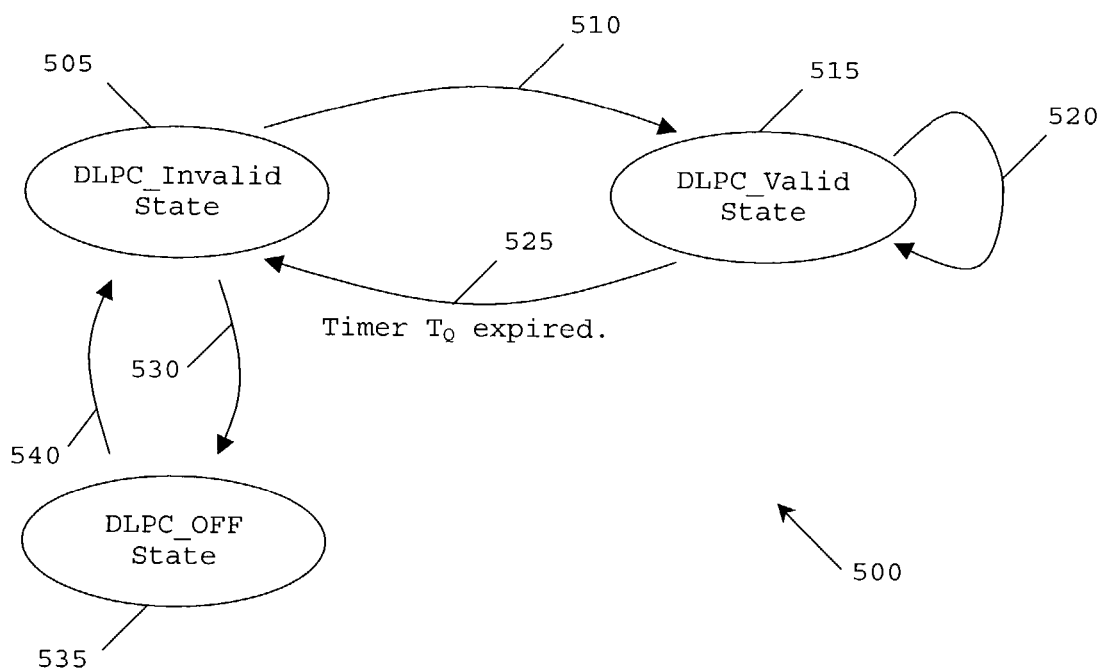
Figure 6:
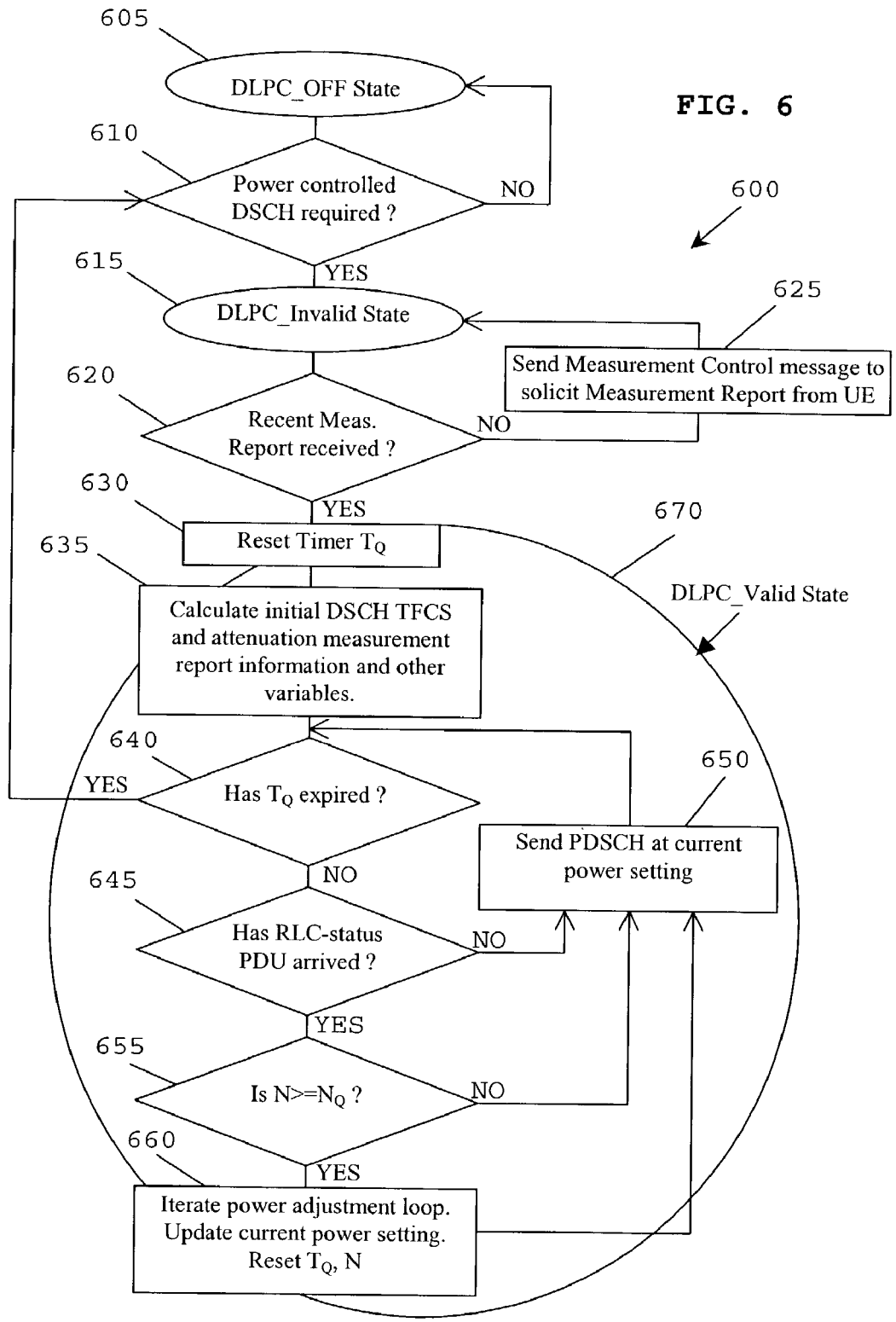

Exemplary embodiments of the present invention will now be described, with reference to the accompanying drawings, in which:

FIG. 3 shows a block diagram of a communication system adapted to support the various inventive concepts of a preferred embodiment of the present invention;

FIG. 4 shows an architectural block diagram of an RNC-Node B-UE communication arrangement, adapted in accordance with various inventive concepts of a preferred embodiment of the present invention;

FIG. 5 shows a state diagram of down link transmissions, adapted in accordance with the preferred embodiment of the present invention; and FIG. 6 shows a flowchart of a downlink shared channel power control operation according to the preferred embodiment of the present invention.

DESCRIPTION OF PREFERRED EMBODIMENTS

In summary, the preferred embodiments of the present invention relate to a power control scheme and/or a scheme for modifying a transmission rate for use in downlink-shared channels in a non fast-fading environment. The concept of rate adaptation is used in order to offer the best possible data rate to all users, at any particular moment in time. In particular, RLC-based information from a UE, indicating on a frequent basis a failure rate of packet data transmissions, is used to select a transport format. The transport format is selected to provide a power level window, with power control and/or rate adaptation used to optimise transmission levels within such window(s).

Hence, as a user equipment moves within a cell, causing the UE's carrier to interference levels to change rapidly, frequent transmission from the UE are used to continually select an optimal transport format, with DL power control and/or rate adaptation used as a fine-tuning process within each transport format to further optimise carrier to interference levels. The rate adaption is implemented by modifying a transport format. The invention is targeted at increasing the overall capacity of downlink shared channels in UTRA TDD. These channels are typically allocated and used sporadically by users on the system, and as such, the requirements for power control are somewhat different to those for dedicated physical channels.

In the context of the present invention, the use of a transport format combination set, applicable to UMTS-based communications systems is described. It is within the contemplation of the invention that the term 'transport format' in this context encompasses certain attributes of a bearer that relate to Layer 1 of a communication system. It is also within the contemplation of the invention that the fine-tuning of carrier to interference levels may be performed by power control and/or rate adaptation and/or any other known means to those skilled in the art. Henceforth, the expression 'power control' should be considered as encompassing all such operations.

Referring now to FIG. 3, a cellular-based telephone communication system 300 is shown in outline, in accordance with a preferred embodiment of the invention. In the preferred embodiment of the invention, the cellular-based telephone communication system 300 is compliant with, and contains network elements capable of operating over, a UMTS air-interface. In particular, the invention relates to the Third Generation Partnership Project (3GPP) specification for wide-band code-division multiple access (WCDMA) standard relating to the UTRAN radio Interface (described in the 3G TS 25.xxx series of specifications).

A plurality of subscriber terminals (or user equipment (UE) in UMTS nomenclature) 312, 314, 316 communicate over radio links 318, 319, 320 with a plurality of base transceiver stations, referred to under UMTS terminology as Node-Bs, 322, 324, 326, 328, 330, 332. The system comprises many other UEs and Node Bs, which for clarity purposes are not shown.

The wireless communication system, sometimes referred to as a Network Operator's Network Domain, is connected to an external network 334, for example the Internet. The Network Operator's Network Domain (described with reference to both a $3^{rd}$ generation UMTS and a $2^{nd}$ generation GSM system) includes:

(i) A core network, namely at least one Gateway GPRS Support Node (GGSN) 344 and or at least one Serving GPRS Support Nodes (SGSN); and (ii) An access network, namely:

(ai) a GPRS (or UMTS) Radio network controller (RNC) 336-240; or (aii) Base Site Controller (BSC) in a GSM system and/or (bi) a GPRS (or UMTS) Node B 322-232; or (bii) a Base Transceiver Station (BTS) in a GSM system.

The GGSN/SGSN 344 is responsible for GPRS (or UMTS) interfacing with a Public Switched Data Network (PSDN) such as the Internet 334 or a Public Switched Telephone Network (PSTN) 334. A SGSN 344 performs a routing and tunnelling function for traffic within say, a GPRS core network, whilst a GGSN 344 links to external packet networks, in this case ones accessing the GPRS mode of the system.

The Node-Bs 322-232 are connected to external networks, through base station controllers, referred to under UMTS terminology as Radio Network Controller stations (RNC), including the RNCs 336, 338, 340 and mobile switching centres (MSCs), such as MSC 342 (the others are, for clarity purposes, not shown) and SGSN 344 (the others are, for clarity purposes, not shown).

Each Node-B 322-332 contains one or more transceiver units and communicates with the rest of the cell-based system infrastructure via an $I_{ub}$ interface, as defined in the UMTS specification.

Each RNC 336-240 may control one or more Node-Bs 322-332. Each MSC 342 provides a gateway to the external network 334. The Operations and Management Centre (OMC) 346 is operably connected to RNCs 336-340 and Node-Bs 322-232 (shown only with respect to Node-B 326 for clarity). The OMC 346 administers and manages sections of the cellular telephone communication system 300, as is understood by those skilled in the art.

In the preferred embodiment of the invention, one or more RNCs 336, 338, 340 and/or corresponding Node-Bs 322-332 have been adapted to provide downlink power control by selecting and utilising an appropriate transport format combination set (TFCS). In particular, the preferred embodiment of the present invention describes a mechanism for adapting DL power control using DL error statistics and/or measurement reports on pathloss and interference. With such information, a more RNC, for example RNC 336, is able to make a decision on whether to increase or decrease the data rate and/or adjust a gain or attenuator in a transmitter chain to reflect a power control of a communication to a UE 312, via changing the Transport Format Combination Set (TFCS).

The DL power control and TFCS selection function 348 indicates to the Node B 322, over the $I_{ub}$ interface, the selected TFCS and corresponding gain control for transmissions to the UE 312. In response to this indication, the Node B 322 adjusts a variable gain element 445 that sets the power control levels of its wireless transmissions.

The various components within the RNC 336 are realised in this embodiment in integrated component form. Of course, in other embodiments, they may be realized in discrete form, or a mixture of integrated components and discrete components, or indeed any other suitable form.

Furthermore, in this embodiment the power control TFCS selection function 348 is implemented preferably in a digital signal processor. However, it is within the contemplation of the invention that the power control TFCS selection function 348 described in the above embodiments can be embodied in any suitable form of software, firmware or hardware. The power control TFCS selection function 348 may be controlled by processor-implementable instructions and/or data, for carrying out the methods and processes described, which are stored in a storage medium or memory.

The processor-implementable instructions and/or data may include any of the following:

(i) Transmission rate and/or power control algorithms;

(ii) Transmission rate and/or power control thresholds; and (iii) Transmission rate and/or power control equations.

The memory can be a circuit component or module, e.g. a random access memory (RAM) or a form of programmable read only memory (PROM), or a removable storage medium such as a disk, or other suitable medium.

It is also envisaged that for other wireless communication systems, other criteria and algorithms or equations could be employed in determining an appropriate power control scheme and/or transmission rate. Such schemes would still benefit from the concept of using status information or measurement reports in order to select a transport format that maximise the use of the available data rate, whilst maintaining an acceptable error performance.

It is also within the contemplation of the invention that such adaptation of the physical layer (air-interface) elements may be alternatively controlled, implemented in full or implemented in part by adapting any other suitable part of the communication system 300. For example, elements involved in determining or facilitating a transmission rate or power control level, such as base site controllers, base transceiver stations (or Node Bs), intermediate fixed communication units (for example repeaters) in other types of systems may, in appropriate circumstances, be adapted to provide or facilitate the power control features as described herein.

Referring now to FIG. 4, a system block diagram, with indications on the signalling information passing between various components, is illustrated in accordance with the preferred embodiment of the present invention.

The signalling information predominantly passes between the radio network controller 336 and one or more UE 312, via the Node B 322 serving the respective UE 312. The RNC 336 is shown, for clarity purposes, as being divided into a radio link control layer (RLC) 405 and a radio resource control layer (RRC) 425. Similarly, the UE 312 is shown, for clarity purposes, as being divided into a radio link control layer (RLC) 470 and a radio resource control layer (RRC)

480, with regard to signalling information. Such layering of a communications is well known in the art, and further described with respect to the 7-layer OSI protocol, see 3GPP TS25.301.

In accordance with the current 3GPP standard, the vast majority of packets sent on a downlink channel are sent 450 from the RLC layer 405 of the RNC 336 in a RLC acknowledged mode (AM), to facilitate re-transmission in the event that the packet is lost over the air interface.

The UE 312 is requested to send a radio link control (RLC) status protocol data unit (PDU) 465 indicating which packets have been received correctly and which have been lost. Such a request is made by setting the poll bit in the RLC message header 440. Hence, after performing a cyclic redundancy check (CRC) on the AM dedicated traffic channel (DTCH) PDUs, a determination of the poll bit notification 475 can be made. The UE 312 then transmits a RLC status PDU 465 in response to the poll initiated by its respective RNC 336.

From this information, the RNC 336 is able to estimate the current downlink block error rate (BLER), as observed by the UE 312. In accordance with the preferred embodiments of the present invention, such BLER information of the downlink-shared channel (DSCH) 410 is input to a DL power control and TFCS selection function 348.

When appropriate, the DL power control and TFCS selection function 348 may decide to supplement such information with measurement reports. As such, the DL power control and TFCS selection function 348 has a control input 420 to the RRC layer 425 of the RNC 336. In response to a request from the DL power control and TFCS selection function 348, the RRC layer 425 of the RNC 336 may transmit a measurement control request 490 to the RRC layer 480 of the UE 312. The RRC layer 480 of the UE 312 transmits a measurement report 485 back to the RRC layer 425 of the RNC 336, which is forwarded 430 to the DL power control and TFCS selection function 348.

Hence, by utilising DSCH error statistics, in conjunction with measurement reports 485 on pathloss and interference, the RNC 336 is able to make a decision on whether to increase or decrease the data rate to the UE 312, by modifying the Transport Format Combination Set (TFCS).

The DL power control and TFCS selection function 348 indicates 435 to the Node B 322, over the $I_{ub}$ interface, the selected TFCS and corresponding gain control for PDSCH transmissions to the UE 312. In response to this indication, the Node B 322 adjusts a variable gain element 445 setting the power control levels of its wireless transmissions.

The differences between the typical carrier to interference (C/I) levels required for each TFCS are preferably known apriori and are stored in the RNC as $SIR_3$. Two variables are also preferably stored in the RNC:
  (i) The current TFCS; and
  (ii) The current attenuation per code from cell reference power ($A_n$)

The currently used TFCS is dynamically indicated to the UE 312 via RRC signalling within the Physical Shared Channel Allocation Message (PSCHAM). Upon a decision to change the power per code delivered to the UE 312 by an amount Δ (as the result of newly-received measurement information, or newly-determined BLER information), the following process is executed for each $j^{th}$ TFCS:—

$$A_{n+1,j} = A_n - \Delta + (SIR_i - SIR_j) \quad [4]$$

Equation [4] effectively calculates the attenuation from the maximum allowable per-code power (usually equal to a cell reference or Primary Common Control Physical Channel (P-CCPCH) power) that would be required when switching to using TFCS j, given the current attenuation ($A_n$), the current TFCS (i), the required power step (Δ) and the differences in SIR between TFCS i and TFCS j.

The TFCS with the smallest positive attenuation $A_{n+1,j}$ is selected as the TFCS that may provide a maximum data rate to the UE whilst not violating the maximum per-code power restriction.

It is envisaged that Δ may be derived in several ways:
  (i) Directly from the RLC layer in the RNC which is receiving RLC status reports on the error performance of the downlink acknowledged mode transmissions, or via BLER measurement reports signalled to RNC by the UE; or
  (ii) From pathloss and interference measurement reports signalled from a UE to RNC; or
  (iii) A combination of the above two schemes.

Furthermore, the inventive concepts of the present invention utilise methods to handle the sporadic data transfer that is characteristic of data-call sessions using shared channels. Pauses in transmission cause subsequent pauses in RLC (or other measurement report-based) BLER information since there is little or no transmitted data to be reported on. As such, it is within the contemplation of the invention that power control may be driven by pathloss and interference-based measurement reports only. However, it is noted that such measurement reports consume valuable uplink resource, which is wasted in the absence of downlink traffic to control. Although it is known for DL PC in PSCHAM to use such measurement reports, it is hereby proposed to use the 'measurement report only' option to adjust TFCS (in contrast to PC) only when there is little traffic to drive the RLC-based PC scheme.

Therefore, in a further embodiment of the present invention, the notion of a "quiet timer" is utilised. The quiet timer is reset and re-started whenever downlink RLC buffer volumes exceed a certain threshold indicating that significant downlink resource is required. When a substantial use of a downlink resource is required, it is obviously desirable to employ power and rate control to maximise throughput. Once the RLC buffer occupancy falls to, or below, a particular threshold, or if the number of PDUs being reported within RLC status reports is below a certain level, for a period of, say, Q ms, it is decided that not enough data volume exists to warrant power/rate-controlled transmissions (which may require significant use of uplink resource). Additionally the incoming error statistics may also be too infrequent or inaccurate to be of use. In this scenario, power control and rate adaptation is switched off until it is determined worthwhile to re-start the procedure.

This is especially useful when the system is used for typical web-browsing applications. This will normally result in periods of downlink activity during HTTP page download, followed by periods of downlink inactivity (while the user digests the information on-screen).

In accordance with the preferred embodiment of the present invention, it is desirable for the downlink power control scheme to utilise a number of logical states, as described below with respect to FIG. 5.

In FIG. 5, a state diagram 500 is shown in accordance with the preferred embodiment of the present invention. The state diagram 500 represents a downlink power control scheme that utilises three logical states:
  (i) DLPC_Invalid state—505;
  (ii) DLPC_Off state—535
  (iii) DLPC_Valid state 515.

Transition between the three states is preferably driven by any of a number of parameters:
(i) DL RLC buffer occupancy and associated thresholds,
(ii) Measurement report information from the UE, and
(iii) On the 'quiet-time' timer $T_Q$.

A first state—a DLPC_Invalid state—505 is employed when it is desirable to utilise adjustment of power control, but the required information has yet to be gathered or is deemed 'out-of-date'. This may happen following an appreciable pause in downlink transmission. In this DLPC_Invalid state 505, initial power control settings must first be established based upon measurement information as measured at the UE, as shown in state transition step 510. The initial power control settings need to be reported to UTRAN before power/rate controlled downlink shared channel allocation can be granted.

However, in order to avoid an increase in system latency, before a measurement report has been received, downlink shared channel allocations may still be granted. However, they preferably use the lowest-rate TFCS and the attenuation must be set to the minimum allowable.

A DLPC Invalid State 505 Transition 510 to a DLPC Valid state 515

For the DL power control scheme to transition 510 from a DLPC_Invalid state 505 to DLPC_Valid state 515, measurement information must be extracted from the UE. This is due to the fact that any previous power control information, from a previous power control adjusted downlink shared channel (DSCH) session, is deemed to be invalid due to the length of the intervening time period. Measurement report information may arrive at the RNC as the result of either:
(i) A UE-initiated process (via various UL messages) or
(ii) As the result of a direct UTRAN measurement report request sent for the explicit purposes of downlink power control.

(a) UE-Initiated Transition to DLPC Valid State 515

Examples of UE-initiated UL messages, in which the relevant measurement report information may be contained, are listed below in Table 1.

TABLE 1

| RRC Message | PCCPCH RSCP | Timeslot ISCP |
| --- | --- | --- |
| CellUpdate | ✓ | ✓ |
| InitialDirectTransfer | ✓ | ✓ |
| PUSCHCapacityRequest | ✓ | ✓ |
| RRCConnectionReEstablishmentRequest | ✓ | ✓ |
| RRCConnectionRequest | ✓ | ✓ |
| UplinkDirectTransfer | ✓ | ✓ |

The above Layer-3 messages are examples of messages that are initiated by the UE that can be used to carry additional measurement information (RSCP and ISCP).

Each time measurement report information is received from the UE, and the DL power control scheme is in the DLPC_OFF state 535 or DLPC_Invalid state 505, a transition to a DLPC_Valid state 515 is enabled and timer $T_Q$ is reset and started.

In particular, a Physical Uplink Shared Channel (PUSCH) Capacity Request message from a UE to UTRAN may optionally contain P-CCPCH received signal code power (RSCP) and a list of Interference Signal Code Power (ISCP) values for specified timeslots. In this model, a UE that has been dormant for a period, but has maintained an RRC connection, sends a PUSCH capacity request to the RNC. It could be expected that downlink transmission would follow shortly after this. As such, by including PCCPCH RSCP and Timeslot ISCP information in a PUSCH Capacity Request Messages, immediate power control can be enabled on the resultant DSCH.

(b) UTRAN-Initiated Transition to a DLPC Valid State 515

In the event that there is sufficient downlink data for a UE to be sent via a DSCH and the power control process is in the DLPC_Invalid state 505, an explicit measurement report request must be signalled to the UE in order to initiate the downlink power control process. To achieve this, a Measurement Control message must be sent from UTRAN to the UE in order to retrieve a Measurement Report message from the UE.

It is noteworthy that PDSCHs that are not power control or transmission rate adjusted may still be employed during this period using the lowest-rate TFCS available with minimum attenuation.

DLPC Valid State 515 Returning (Transition 520) to a DLPC Valid State 515

The DLPC_Valid state is retained so long as RLC status information pertaining to N>=$N_Q$ PDUs arrives at the RNC 336, where:

N=is a counter; and $N_Q$ is a minimum threshold value put in place in order to prevent the loop adjusting the power to a UE from which sufficiently reliable PDU error statistics have not been received.

Furthermore, the DLPC_Valid state 515 is only maintained if the quiet timer $T_Q$ has not expired. The quiet timer, denoted $T_Q$, is used to determine the duration of this allowable 'quiet' period. Optionally, the timer may be continuously reset to maintain (transition 520) the DL power control scheme in a DLPC_Valid state 515. A timer $T_Q$ reset may be based on a number or frequency of PDU reported information and/or based on the DL RLC buffer volume and thresholds.

A DLPC Valid State 515 Transition 525 to a DLPC Invalid state 505

A DLPC_Valid state 515 transitions to a DLPC_Invalid state 505 occurs when the timer $T_Q$ expires. The measurement reporting process for P-CCPCH RSCP and timeslot ISCP may (optionally) be terminated at this point to conserve UL physical resource. This may be performed using, for example, the Measurement Control RRC message.

DLPC OFF State 535 Transition 540 to the DLPC Invalid State 505

A DLPC_OFF state 535 is employed for downlink transmissions that do not use power control. If the DL power control scheme is in a DLPC_OFF state 535, no action need be taken to transition from the DLPC_OFF state 535 to the DLPC_Invalid state 505. Any transition is based purely on a desire to perform a power control adjustment operation on a downlink shared channel transmission. Such an indication to transition may be based on the DL RLC buffer volume or, for example, when transitioning from a fast access channel (FACH) mode to a DSCH mode.

As shown, in order to enter the DLPC_Valid state 515, the process must transition from the DLPC_OFF state 535 via the DLPC_Invalid state 505 into the DLPC_Valid state 515 before power control on DSCH can be performed. This ensures that recent measurement report information is obtained, in order that a good estimate as to the initial transport format rate and the initial required attenuation may be made.

The TFCS selection algorithm, used in the preferred embodiment of the present invention, employs the following equation:

$$\text{Avail}_j = \{(PCCPCH\_RSCP - \text{Timeslot}\_ISCP) - SIR_j K_{PDSCH}\} \geq 0 \quad [5]$$

where the parameters used to determine the initial TFCS and attenuation are:

(i) PCCPCH RSCP—Received Signal Code Power of the P-CCPCH beacon physical channel. This parameter is signalled by a UE in a measurement report.

(ii) Timeslot ISCP—Interference Signal Code Power of a specified timeslot. This parameter is signalled by a UE in a measurement report.

(iii) $SIR_j$—A nominal target SIR per code for TFCS j. This parameter is known apriori and stored at the RNC.

(iv) $K_{PDSCH}$—A constant value, which is configurable within the RNC. This parameter is used to provide a conservative margin on the initial TFCS and attenuation values selected.

Once the above parameters are known to the RNC, each TFCS is tested to see whether it is available using equation [5].

The highest rate TFCS (j=i) for which $\text{Avail}_j$ is TRUE in equation [5], is then selected.

The initial attenuation used per code (relative to P-CCPCH transmit code power) is calculated as:—

$$A_{0,i} = PCCPCH\_RSCP - \text{Timeslot}\_ISCP - SIR_i - K_{PDSCH} \quad [6]$$

Referring now to FIG. 6, a flowchart 600 of the DL power control scheme according to the preferred embodiment of the present invention is illustrated. It is assumed that the DL power control scheme will commence in a DLPC_OFF state, as shown in step 605. If the operating conditions change such that a power controlled DSCH is required, in step 610, a transition occurs to a DLPC_Invalid state, as shown in step 615.

If a recent measurement report has been received from the UE, in step 620, the quiet timer $T_Q$ is reset in step 630. If a recent measurement report has not been received from the UE, in step 620, then a measurement control message is transmitted from the UTRAN to the UE to solicit a measurement from the UE, as shown in step 625.

When a UE measurement report has been received in step 620, the scheme transitions to a DLPC_Valid state 670. Appropriate parameters for calculating equation [4] are extracted and a calculation of the initial DSCH TFCS to use is made. Furthermore, a calculation is made on the initial attenuation level to use, in equation [5], as shown in step 635.

A determination is then made as to whether the quiet timer $T_Q$ has expired in step 640. If the quiet timer $T_Q$ has expired in step 640, a transition of the power control scheme to a DLPC_Off state occurs, as shown in step 610. If the quiet timer $T_Q$ has not expired in step 640, a determination is made as to whether the RLC-status PDU information has arrived, in step 645. If the RLC-status PDU information has not arrived in step 645, a PDSCH is sent at the current power setting, as shown in step 650, and the quiet timer $T_Q$ checked in a loop back to step 640.

If the RLC-status PDU information has arrived in step 645, a determination is made as to whether N>=$N_Q$ PDUs, in step 655. If it is determined that N>=$N_Q$ PDUs, in step 655 has not been satisfied, a Physical Downlink Shared Channel (PDSCH) is sent at the current power setting, as shown in step 650, and the quiet timer $T_Q$ checked in a loop back to step 640.

If it is determined that N>=$N_Q$ PDUs, in step 655 has been satisfied, an iteration of the power adjustment loop is performed, as shown in step 660. The current power setting is then updated, and the quiet time $T_Q$ and N values are reset. A PDSCH is then sent at the current power setting, as shown in step 650, and the quiet timer $T_Q$ checked in a loop back to step 640. The DLPC_Invalid state 670 is then maintained until the quiet timer $T_Q$ has expired in step 640, whereby a transition of the power control scheme to a DLPC_Off state occurs.

It will be understood that the method and arrangement for open-loop power control described above provides at least the following advantages:

(i) The TFCS that provides the maximum data rate to the UE is selected, whilst not violating the maximum per-code power restriction.

(ii) Implementation of this invention allows standards compliance to be retained.

(iii) Minimises the signalling overhead.

Hence, the aforementioned method and arrangement for providing power control substantially negates at least the problems associated with the update rate limitations of the PC scheme in an UTRA-TDD CDMA wireless communication system.

Thus, a configuration and method for effecting power control or adapting transmission rates in a wireless communication system has been described wherein the aforementioned disadvantages associated with prior art arrangements has been substantially alleviated.

Whilst specific, and preferred, implementations of the present invention are described above, it is clear that one skilled in the art could readily apply variations and modifications of such inventive concepts.

The invention claimed is:

1. A radio network controller comprising:
means for obtaining measurement reports from a wireless subscriber wilt;
means for determining whether data in the measurement reports provides sufficient basis for adjusting one or more of a downlink transmission rate and a power control level;
means for initially determining one or more of a downlink transmission rate and a power control level based on the measurement report data;
means for modifying the initially determined one or more of the downlink transmission rate and the power control level in response to said measurement report data by modifying a communication channel format; and wherein
the means for modifying are responsive to the determination of measurement report data sufficiency by not determining or modifying if it is determined that the measurement report data is insufficient.

2. The radio network controller according to claim 1, wherein the means for obtaining measurement report data includes means for obtaining an error performance indication of a downlink communication link; and/or obtaining a downlink pathloss measurement report, and/or obtaining a downlink interference measurement.

3. The radio network controller according to claim 1, further comprising a processor operably coupled to the means for obtaining measurement report data wherein the processor calculates a downlink transmission rate or power control level from RLC status reports of downlink acknowledged mode transmissions.

4. A method for controlling transmission levels in a wireless communication system, the method comprising:

obtaining transmission information from a wireless subscriber unit;

initially selecting a transport format for downlink transmission to the wireless subscriber unit based on the transmission information;

determining whether the feedback received from the wireless subscriber unit is sufficient for optimizing the transmission level; and alter selecting the transport format, optimizing a transmission level for downlink transmissions to the wireless subscriber unit by using one or more of power control and rate adaptation based on feedback received from the wireless subscriber unit, if the feedback is sufficient.

\* \* \* \* \*